Aug. 31, 1965   J. A. GILDER ETAL   3,203,523
CLUTCH WITH LOAD LIMITING DEVICE
Filed Oct. 3, 1963   2 Sheets-Sheet 1
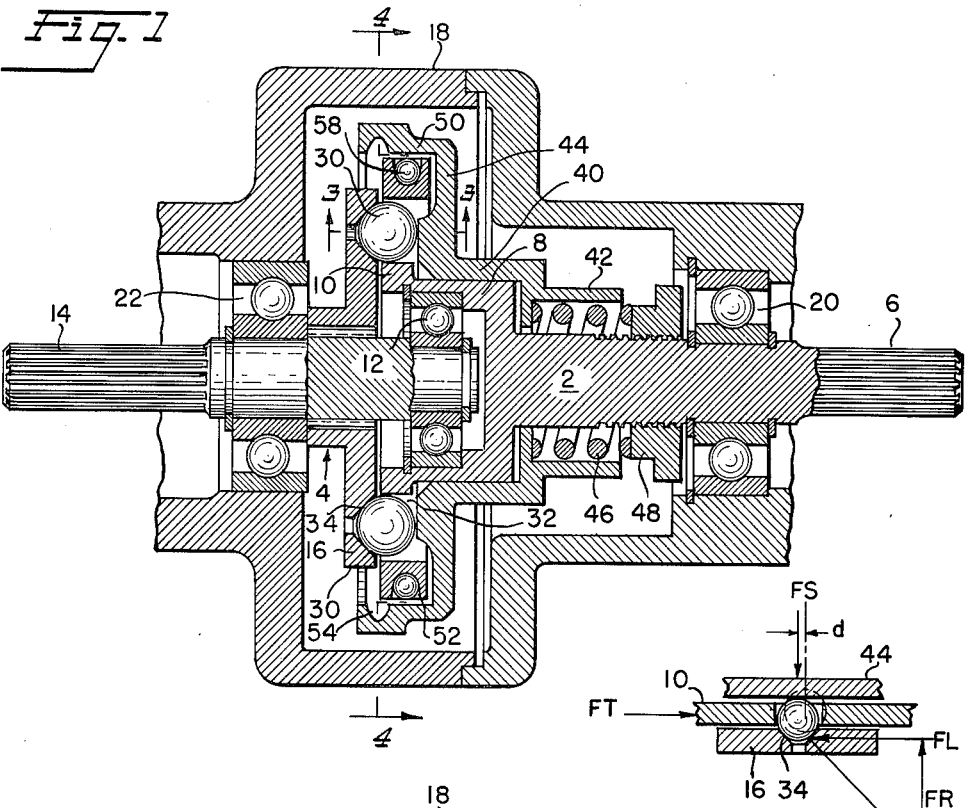
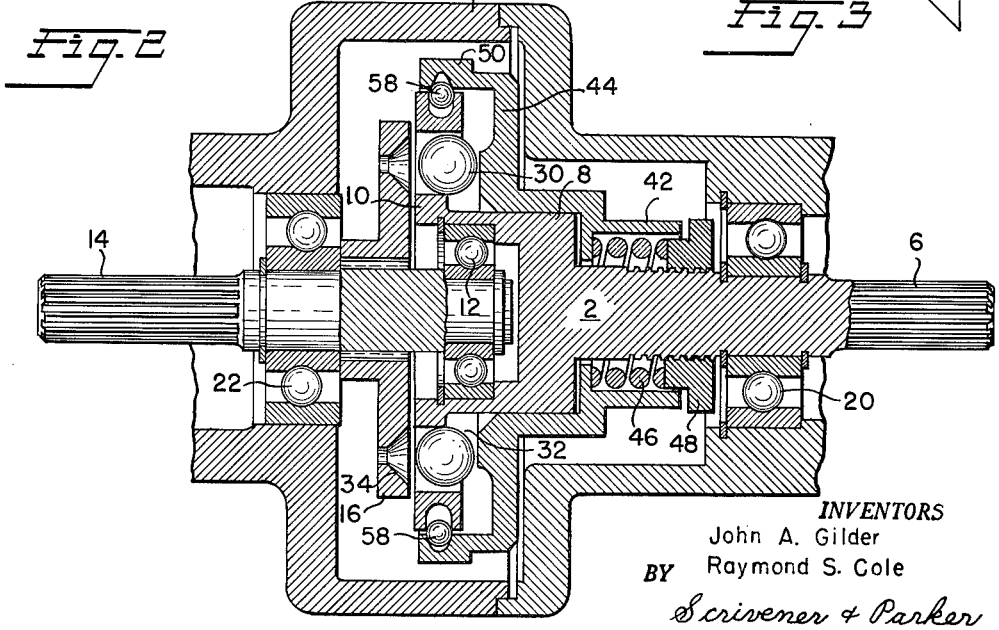
INVENTORS
John A. Gilder
Raymond S. Cole
BY
Scrivener & Parker
ATTORNEYS Aug. 31, 1965    J. A. GILDER ETAL    3,203,523
CLUTCH WITH LOAD LIMITING DEVICE
Filed Oct. 3, 1963    2 Sheets-Sheet 2

INVENTORS
JOHN A. GILDER
RAYMOND S. COLE

BY *Scrivener & Parker*

ATTORNEYS

United States Patent Office 3,203,523
Patented Aug. 31, 1965

3,203,523
CLUTCH WITH LOAD LIMITING DEVICE
John A. Gilder and Raymond S. Cole, Los Angeles, Calif., assignors to Electronic Specialty Company, Los Angeles, Calif., a corporation of California
Filed Oct. 3, 1963, Ser. No. 313,681
6 Claims. (Cl. 192—56)

This invention relates broadly to devices, such as clutches, for connecting a rotating drive shaft to a rotatable driven shaft and, more particularly, to devices for disconnecting the driving and driven parts of such a clutch device when the torque load on the driven shaft reaches a predetermined high value.

Devices for disconnecting the driving and driven elements of a clutch and locking the clutch parts in disengaged position upon overloading of the driven element are well known. However, known lockout devices of this type require manual release in order to re-engage the clutch elements, and while this is acceptable in many uses and types of apparatus it is not desirable or adequate for use in such devices as actuators which are used to operate parts on which are imposed very high and variable loads. Such loads are produced on aircraft control surfaces when, for example, the aircraft is operated in certain maneuvers or at very high speeds, producing very high and unpredictable loads on the control surface. The loading of such control surfaces is such that a predetermined overload condition that would cause clutch disengagement under one operating condition would not necessarily exist under other operating conditions, with the result that the overload release would not be operable under all conditions in which its operation would be required.

It has been the principal object of the present invention to provide a lockout device which is operable at a predetermined high speed of rotation of the driving member for maintaining the driving and driven elements of a clutch disengaged when a predetermined speed of the driving member and a predetermined load on the driven member are reached, and for causing re-engagement of the clutch elements when the speed of rotation of the driving member decreases to a predetermined value.

The invention is described in the following specification and is illustrated in the accompanying drawing in which:

FIG. 1 is a view, partly in section and partly in elevation, showing a drive shaft, a driven shaft, a clutch means for drivingly connecting these shafts, and the lockout means provided by the invention;

FIG. 2 is the same as FIG. 1 but shows the parts with the drive connection disconnected and the lockout means in operable position;

FIG. 3 is a fragmentary view of parts shown in FIGS. 1 and 2, showing in particular the forces exerted by and on the drive connecting means.

Figure 4:
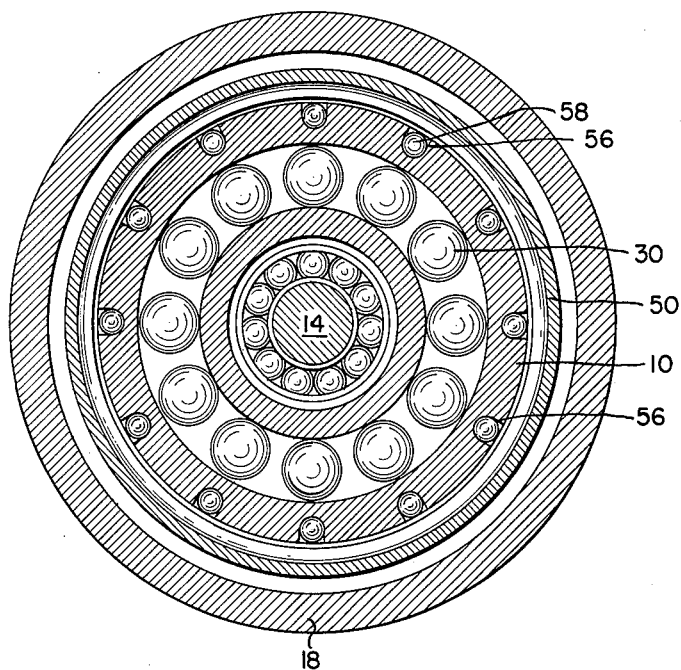
FIG. 4 is a view taken on line 4—4 of FIG. 1.

A preferred embodiment of the invention is disclosed in the drawings and comprises a drive member 2 and a driven member 4 and the overload release and lockout device provided by the invention. The driving element 2, in the disclosed form of the invention, is formed on the end of a drive shaft 6 and has a cylindrical part 8 and a circular radial part 10 formed on and extending outwardly from the outer periphery of the cylindrical part 8. The cylindrical part 8 is interiorly and rotatably supported by ball bearing 12 on the end of driven shaft 14, on which is splined a circular disk 16 which is positioned closely adjacent the disk 10 of the driving part of the clutch. The clutch, including the parts already described is enclosed by a housing 18, and the driving and driven shafts are rotatably journaled in opposite parts of this housing by ball bearings 20, 22 respectively.

The means for transmitting rotational movement of the drive shaft 2 to the driven shaft 14 in the normal operation of the device comprises a plurality of balls 30 each of which is positioned within one of a circular series of apertures 32 in the driving disk 10. The driven disk 16 is provided with an equal number of frusto-conical recesses 34 which open toward the driving disk 10, and the balls 30 are constantly urged toward the driven disk and partially into these recesses by a ball loading device. This device comprises a member having a cylindrical part 40 which surrounds and is mounted on the outer surface of the cylindrical part 8 of the driving member for axial sliding movement thereon, a cylindrical part 42 which surrounds and is spaced from the drive shaft 2, a radial disk part 44 which extends outwardly from the cylindrical part 40, and a compression spring 46 which surrounds the drive shaft 2 and is enclosed by the cylindrical part 42. The outer end of the spring 46 bears on an abutment member 48 which is threaded to drive shaft 2 for adjusting movement along the shaft, and at its other end the spring bears on a flange extending inwardly from the cylindrical part 40 of the ball loading member. The parts are so constructed and arranged that one surface of the disk part 44 of the loading member engages the balls 30 and the spring 46 constantly urges the loading member toward the driven disk 16, thus maintaining the balls partially within their apertures 32 in the driving disk 10 and partially within the frusto-conical recesses 34 in the driven disk 16.

The parts thus far described are operable to transmit rotational movement of the drive shaft to the driven shaft in the following way, reference being made to FIG. 3 in addition to the other figures. In the normal operation of the device the spring 46, acting through the ball loading member consisting of the parts 40, 42, 44, constantly urges the balls 30 to a position in which each ball is partially within its aperture 32 in the driving disk 10 and partially within one of the frusto-conical recesses 34 in the driven disk 16, thus providing a driving connection between the driving and driven disks 10 and 16.

FIG. 3 shows the force vectors that govern the action of this detent drive coupling. Vector FT is the force due to the torque applied to the drive shaft 2 and ball plate 10, FL is the reaction force caused by the resisting load torque of the driven shaft 14 and detent plate 16, and FS is the force exerted on the ball loading disk 44 by spring 46. Because of the frusto-conical shape of the wall of each recess 34 in the driven disk 16 the resisting force FL has thrust component FR which is opposed by the spring force FS. When the load FL exceeds the maximum torque that the clutch is designed to transmit, the component FR of the load reaction will exceed the spring force FS and the balls 30 will be forced out of the detent recesses 34 to the positions shown in broken line in FIG. 3, thus disengaging the driving disk 10 from the driven disk 16 and permitting the driving shaft and its connected parts to rotate free of the driven shaft and its connected parts.

It will be observed, however, that after the balls move out of their detent recesses they will continue to move with the rotating driving disk and when they reach the next adjacent detent the spring force which is constantly exerted on the balls through the driving disk will force them into the detent recesses, whereby the driving member will again attempt to engage and drive the load member. However, unless the load on the driven shaft has been sufficiently reduced since disengagement of the balls from the detent recesses, and the inertia of the driven shaft and load is sufficiently small that the driven disk 16 can be accelerated to the same speed as the drive disk 10 in less time than is required for the drive disk to travel the distance *d* (see FIG. 3), the balls will again come out of the detent recesses and the drive and driven disks will not be engaged. The distance "*d*" is the distance between the positions of the center of each ball in its fully engaged position within a detent recess 34 and in its fully disengaged position outside the same recess. At high rotational speeds of the drive shaft the impact forces produced when the balls attempt to re-engage in the detent recesses can be very high and may exceed the strength of the materials of the parts, thus causing failure or reducing the life of the device.

Means are provided by the invention for inhibiting the connective action or function of the balls after disengagement of the drive and driven parts and so long as the drive shaft and its connected parts rotate at a predetermined high speed, these means being preferably operative by centrifugal force due to the high speed of the rotating drive parts to lock the ball loading means in a retracted position in which the balls are not urged toward the driven disk 16 and therefore do not operatively enter the detent recesses therein. These means comprise an annular, cylindrical rim 50 extending axially from the outer periphery of the ball loading member 44 and preferably formed integrally therewith, and extending toward the driven disk 16. This rim member, which is hereafter referred to as the locking member, is spaced radially outwardly of the outer peripheral edges of the driving disk 10 and driven disk 16 and extends in an axial direction toward the driven disk such a distance that it overlies the driving disk 10, and the part of the inner surface of the locking member which overlies the driving disk in the normal unlocked position of the locking member is a smooth cylindrical surface 52.

Axially outwardly of this surface 52 in the direction of the driven disk 16 the inner surface of the locking member is provided with an annular groove 54. The outer periphery of the driving disk 10 is provided with a plurality of bottomed recesses 56, each of which opens outwardly, and in each of these recesses there is positioned a ball 58. The spacing of the lock-out member 50 radially outwardly from the outer periphery of the drive plate 10, the diameter of each of the balls 58, and the depth of the groove 54, are made such that when the groove 54 is radially aligned with the balls 58, as will be described hereinafter, the balls will move, as by centrifugal force, into the groove and in this position will be positioned partly within the groove and partly within the ball recesses 56, as is clearly shown in FIG. 2.

*Operation*

In the normal operation of the force transmitting device, rotation of the drive shaft 6 will be transmitted to the driven shaft 14 by drive member 2, driving disk 10, balls 30, the walls of detent recesses 34, and driven disk 16, and the driving connection between the balls and the detent recesses will be maintained by spring 46 so long as the load on the driven shaft (vector FL) does not exceed a predetermined value.

When the load torque exceeds this value the balls 30 disengage from their detent recesses 34, forcing the ball loading member 40, 42, 44 back against the force of spring 46, compressing the spring. The locking member 50, which is part of the ball loading member is thus moved to a position in which the groove 54 is in radial alignment with the driving disk 10 and the balls 58 in the recesses 56 in its periphery. When this occurs at a high speed of the drive shaft and its connected parts, the balls 58 are forced outwardly by centrifugal force to a position in which they are partly in their recesses 56 and partly in the groove 54. This locks the ball loading member 40, 42, 44 in retracted position, removing the load of spring 46 from the balls 30, whereby the balls are not urged toward or into the detent recesses 34, and thus locking the driving and driven parts in disengaged position. The drive shaft and its connected parts now run free of the load member and there will be no re-engagement of the clutch so long as the high speed continues. The number and size of the balls 58 are such that the loading spring 46 is not able to overcome the centrifugal force of the balls until the driving member has slowed down after shut-off to such a speed that the balls 30 may re-engage their detent recesses 34 with safe impact forces. It will be seen that as the balls 58 are released from lockout position during slowdown after shut-off, the unit will always come to standstill with the driving connection in engaged position, thus, permitting the acceleration of maximum load at start up.

While in this specification balls have been described as the means used for both torque transmission means and lockout, it will be understood that the invention is not limited to the use of the balls for performing either of these functions, and that other means such as pivoted pins and the like may be used within the scope of the invention. Further, other substitutions may be made without departing from the spirit or scope of the invention, for the limits of which reference must be made to the appended claims.

What is claimed is:

1. A clutch device for connecting and disconnecting a drive shaft and a driven shaft, comprising adjacent parts on the drive and driven shafts respectively, connecting means carried by the drive shaft part and movable toward and away from the driven shaft part, a spring normally urging the connecting means toward the driven shaft part to establish a driving connection between the parts, means operable upon a pre-determined increase in the load on the driven shaft for overcoming the force of said spring and moving the connecting means out of driving engagement with the driven part, and a lock-out device comprising means operable by centrifugal force created by the speed of rotation of the drive shaft and operable upon movement of the connecting means out of driving engagement with the driven part upon the said increase in the load on the driven shaft to lock the connecting means in position away from the driven shaft against the force of the spring.

2. A clutch device for connecting and disconnecting a drive shaft and a driven shaft, comprising co-operating connecting means on the drive and driven shafts respectively, the means on the drive shaft being movable toward and away from the means on the driven shaft to establish and release driving connection between the two shafts, a spring constantly urging the means on the drive shaft toward the means on the driven shaft, the means on the driven shaft being operable to move the drive shaft carried means out of driving connection with the driven shaft upon predetermined increase in the load on the driven shaft, and clutch lock-out means having a normal release condition and being movable to lock-out condition upon predetermind increase of the driven shaft load and of the drive shaft speed and comprising a part movable against the force of said spring upon operation of said means for moving the drive shaft carried means out of driving connection with the driven shaft, and means carried by the drive shaft and movable by centrifugal force due to the speed of rotation of the drive shaft into locking engagement with said part.

3. A clutch device for connecting and disconnecting a drive shaft and a driven shaft, comprising a plate attached to the drive shaft and having a circular series of openings therein, a driving ball positioned in each of said openings, a plate attached to the driven shaft and positioned adjacent and in face-to-face relation to the drive shaft plate and having a circular series of frusto-conical detent recesses therein opening toward the drive shaft plate, means engaging the balls and urging them toward the driven shaft plate whereby the balls engage in the detent recesses in the driven shaft plate to provide a releasable driving connection between the two plates, means for locking the ball-urging means in a position removed from the driven shaft plate whereby the balls will not ;engage in the detent recesses in the driven shaft plate, said means comprising a plurality of recesses arranged in a circular path in the periphery of the drive shaft plate each of which opens radially outwardly, a locking ball in each of said recesses, a locking member surrounding the drive shaft plate and connected to the means engaging and urging the driving balls and rotatable therewith and having an inner cylindrical surface normally positioned radially opposite the locking balls and maintaining said balls in their recesses and also having a groove therein which opens inwardly toward the drive shaft plate and is normally axially displaced from the locking balls in the direction toward the driven shaft plate, whereby when the driven shaft load exceeds a predetermined valve the driving balls are forced from the detent recesses thus moving the locking member in the direction away from the driven shaft plate to a position in which the groove in the locking member is radially opposite the locking balls whereby the locking balls are moved by centrifugal force at a predetermined high speed of the drive shaft and its connected parts partially into the groove to lock the means normally urging the driving balls toward the driven shaft plate in a position in which the driving balls are not urged toward the driven shaft plate.

4. A clutch device for connecting and disconnecting a drive shaft and a driven shaft, comprising adjacent parts on the drive and driven shafts respectively, connecting means carried by the drive shaft part and movable toward and away from the driven shaft part, a spring normally urging the connecting means toward the driven shaft part to establish a driving connection between the parts, means operable upon a predetermined increase in the load on the driven shaft for overcoming the force of said spring and moving the connecting means out of driving engagement with the driven part, and a lock-out device comprising means operable by centrifugal force created by the speed of rotation of the drive shaft and operable upon movement of the connecting means out of driving engagement with the driven part upon the said increase in the load on the driven shaft to lock the connecting means in position away from the driven shaft against the force of the spring, said lock-out means being operable to normal release condition upon decrease in the speed of rotation of the drive shaft to a predetermined value from the high speed creating the centrifugal force required to operate the lock-out device to permit the connecting means to return to driving engagement with the driven part.

5. A clutch device for connecting and disconnecting a drive shaft and a driven shaft, comprising co-operating driving connecting means on the drive and driven shafts respectively, the means on the drive shaft being movable toward and away from the means on the driven shaft to establish and release driving connection between the two shafts, a spring constantly urging the means on the drive shaft toward the means on the driven shaft, the means on the driven shaft being operable to move the drive shaft carried means out of driving connection with the driven shaft upon predetermined increase in the load on the driven shaft, and clutch lock-out means having a normal release condition and being movable a lock-out condition upon predetermined increase of the driven shaft load and of the drive shaft speed and comprising a part movable against the force of said spring upon operation of said means for moving the drive shaft carried means out of driving connection with the driven shaft, and means carried by the drive shaft and movable by centrifugal force due to the speed of rotation of the drive shaft into locking engagement with said part, said lock-out means being operable to normal release condition upon a predetermined increase in the speed of rotation of the drive shaft from the high speed creating the centrifugal force required to operate the lock-out device to permit the drive shaft carried means to return to driving connection with the driven shaft.

6. A clutch device for connecting and disconnecting a drive shaft and a driven shaft, comprising a plate attached to the drive shaft and having a circular series of openings therein, a driving ball positioned in each of said openings, a plate attached to the driven shaft and positioned adjacent and in face-to-face relation to the drive shaft plate and having a circular series of frusto-conical detent recesses therein opening toward the drive shaft plate, means engaging the balls and urging them toward the driven shaft plate whereby the balls engage in the detent recesses in the driven shaft plate to provide a releasable driving connection between the two plates, means for locking the ball-urging means in a position removed from the driven shaft plate whereby the balls will not engage in the detent recesses in the driven shaft plate, said means comprising a plurality of recesses arranged in a circular path in the periphery of the plate attached to the drive shaft, each of which opens radially outwardly, a locking ball in each of said recesses, a locking member surrounding the drive shaft plate and connected to the means engaging and urging the driving balls and rotatable therewith and having an inner cylindrical surface normally positioned radially opposite the locking balls and maintaining said balls in their recesses and also having a groove therein opening inwardly toward the drive shaft plate and normally positioned axially toward the driven shaft plate from the locking balls whereby when the driven shaft load exceeds a predetermined value the driving balls are forced from the detent recesses thus moving the locking member in the direction away from the driven plate to a position in which the groove in the locking member is radially opposite the locking balls whereby the locking balls are moved by centrifugal force at a predetermined high speed of the drive shaft and its connected parts partially into the groove to lock the means normally urging the driving balls toward the driven plate in a position in which the driving balls are not urged toward the driven plate, said locking balls being moved out of locking position in the groove upon decrease in the speed of rotation of the drive shaft and its connected parts to a predetermined value from the high speed creating the centrifugal force required to move the locking balls to their locking positions within the groove to permit the ball urging means to move the driving balls into driving position within the detent recesses in the driven shaft plate.

References Cited by the Examiner
UNITED STATES PATENTS

| | | | |
|---|---|---|---|
| 2,401,992 | 6/64 | Waller | 192—56 |
| 2,723,014 | 11/55 | Locke | 192—56 |
| 2,743,636 | 5/56 | Shaff | 192—56 X |
| 3,080,029 | 3/63 | Stober | 192—56 |

DON A. WAITE, *Primary examiner.*